3,222,339
POLYMERIZATION PROCESS USING AN ORGANO-
MAGNESIUM COMPOUND AS CATALYST
Robert P. Fellmann, Levittown, Pa., and Mary J. Kampf, Erlton, N.J., assignors to Rohm & Haas Company, Philadelphia, Pa., a corporation of Delaware
No Drawing. Filed Aug. 14, 1962, Ser. No. 216,724
11 Claims. (Cl. 260—89.5)

This invention concerns a process for preparing acrylic polymers with good reproducibility from lot to lot, with relatively high molecular weights, and, in the case of those polymers formed with an organomagnesium bromide and having a considerable degree of stereoregularity, with a marked degree of regularity both as to spacing of molecular chain axes and as to distribution of atoms and groups around these axes. In these cases, this process permits control of the extent of crystallinity.

It has recently been shown that crystallizability can be developed in polymerization of methyl methacrylate (Fox et al., J. Amer. Chem. Soc. 80, 1768 [1958], and R. G. J. Miller et al., Chemistry & Industry 41, 1323 [1958]), of tert-butyl acrylate (M. L. Miller and Rauhut, J. Amer. Chem. Soc. 80, 4115 [1958], and of various alkyl and cycloalkyl acrylates (Garrett et al., ibid. 81, 1007 [1959]). In the several methods of preparing these macromolecules in a crystallizable or crystalline state, it has been found that there is much variation from batch to batch in the degree of regularity and in molecular size. With these variations, it has been very difficult to reproduce desired polymers. Insignificant and unnoticed changes in conditions or states of purity of monomers, catalysts, and polymerization systems have brought about unpredictable changes in the polymeric products.

Variations, lack of reproducibility, and poor results often obtained are inherent in methods of the prior art, such as the work of Landler (Rec. trav. Chim. 68, 992 (1949)), in which poly(methyl methacrylate) of a molecular weight of 10,000 to 20,000 was reported. When organomagnesium compounds are premixed with salts, such as metal halides, as has been proposed in the polymerization of olefins, variations are not avoided and many such combinations fail to produce polymers of useful molecular size.

These difficulties relating to preparation of polymers with structural regularities are in large measure overcome by the process of this invention. This process is also advantageously applicable to the preparation of polymers not characterized by marked regularity. It comprises forming a catalyst solution of an organomagnesium compound in an acrylic ester between about 3° C. and 40° C., preferably at 10° to 30° C. (about room temperature), mixing this catalyst solution with acrylic ester to be polymerized, and holding the mixture with agitation at polymerizing temperatures. The ester used in forming the catalyst may be the same or different from the bulk of ester or esters to be polymerized. The ratio of organomagnesium compound to an acrylic ester to form the catalyst solution may vary between 0.3 and about 1.5 moles per mole of ester used to form the catalyst solution, and preferably from about 0.5 to 1.0 mole per mole of monomer.

The ratio of organomagnesium compound per mole of monomer to be polymerized may be varied between 0.01 and 0.2 mole per mole of monomer and is preferably 0.04 to 0.15 mole of such compound per mole of ester.

Monomer is best polymerized in solution containing 0.1 to 3 moles of monomer per liter. The solvent may be one for both monomer and polymer, such as toluene, xylene, aromatic naphtha, or an ether, including diethyl ether, diisopropyl ether, dibutyl ether, the dimethyl ethers of ethylene glycol or diethylene glycol, tetrahydropyran, tetrahydrofuran, and mixtures of ethers. There may similarly be used a solvent for the monomer, such as lower liquid alkanes and mixtures thereof and mixtures of these with one or more of the above-noted solvents. Typical alkanes are hexanes, heptanes, octanes, nonanes, and the like. Cuts of petroleum ethers and naphthas may be used. Excess ester may also serve as solvent, but the use of the above added solvents for both monomer and polymer seems at present much to be preferred. The solvent or solvents used will, of course, be unreactive in the Zerewitinoff test.

As monomers which are polymerized by the process of this invention, there may in general be used any esters of acrylic and methacrylic acids, which esters are free from hydrogen reacting with the organomagnesium compounds as may be determined in the Zerewitinoff test, these being included in the generic term "acrylic esters." The alcohol portion of these esters may be one such as alkyl, alkenyl, cycloalkyl, terpenyl, aralkyl, or aryl or similar group containing a heteroatom as in alkoxyalkyl, aryloxyalkyl, alkylthioalkyl, or dialkylamidoalkyl. The greatest value of the process, however, is obtained when the acrylic ester is one capable of yielding polymers with marked stereoregularity. The esters giving a regularity which leads to crystallinity include esters of acrylic acid having the structure

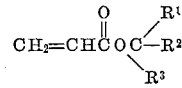

wherein $R^1$ and $R^2$ represent, when taken individually, methyl or ethyl groups and $R^3$ represents hydrogen or methyl. Among these esters are isopropyl acrylate, sec-butyl acrylate, tert-butyl acrylate, and 3-pentyl acrylate. When $R^1$ and $R^2$ are taken together, they form a saturated divalent aliphatic chain of four to five carbon atoms. Typical esters of this type are cyclopentyl acrylate, cyclohexyl acrylate, and 4-methylcyclohexyl acrylate. Another type of ester giving polymers of marked regularity is isobornyl acrylate. There may also be formed copolymers of two or more of the above-defined acrylates with a high degree of regularity. Of the esters of methacrylic acid which can be formed to exhibit crystallinity, there should be mentioned especially methyl methacrylate.

The process may also be applied to acrylic esters which do not provide such striking changes in properties due to stereoregularity. In the case of these it ensures relatively high molecular weights of the homopolymers and copolymers, improved reproducibility of polymers, and a narrower distribution of molecular sizes, advantages which are also obtained when the polymers are more noticeably crystalline. Thus there may be polymerized by the method of this invention methyl acrylate, ethyl acrylate, propyl acrylate, n-butyl acrylate, isobutyl acrylate, hexyl acrylate, 2-ethylhexyl acrylate, n-octyl acrylate, dodecyl acrylate, cetyl or stearyl acrylates, allyl acrylate, 3-pentenyl acrylate, dicyclopentenyl acrylate, trimethylcyclohexyl acrylate, benzyl acrylate, phenyl acrylate, phenoxyethyl acrylate, methylthioethyl acrylate, ethoxyethyl acrylate, sec-butyl thiolacrylate, or tetrahydrofurfuryl acrylate, and corresponding methacrylates.

Organomagnesium compounds for effecting polymerization may be represented by the formula R—Mg—Y where R is alkyl, cycloalkyl, aralkyl, aryl, alkoxyaryl, alkenyl, alkynyl, or aralkenyl, and Y represents bromine or a group defined by R. The preferred R groups are alkyl of two to twelve carbon atoms, although larger groups can be used, or a phenyl group. In the selection of an organomagnesium compound, it is desirable to choose one which has solubility in the reaction system under the specific conditions chosen for polymerization.

Typical R groups include ethyl, propyl, butyl, isobutyl, sec-butyl, amyl, octyl, dodecyl, phenyl, methylphenyl, butylphenyl, diamylphenyl, or methoxyphenyl, in the preferred classes, and others, such as benzyl, methylbenzyl, cyclohexyl, methylcyclohexyl, butylcyclohexyl, cyclopentyl, crotyl, undecenyl, dodecenyl, butynyl, hexynyl, phenylethynyl, or cinnamyl.

Examples of specific magnesium compounds are diethyl-, dibutyl-, dioctyl-, didodecyl-, dibenzyl-, dicyclohexyl-, diallyl-, di-1-hexynyl-, diphenyl-, ditolyl-, or di(biphenyl)-magnesiums and bromides of ethylmagnesium, butylmagnesium, hexylmagnesium, 1-hexynyl-magnesium or phenylethynylmagnesium, 2-ethylhexylmagnesium, n-octyl - magnesium, dodecylmagnesium, benzylmagnesium, butylbenzylmagnesium, cyclopentylmagnesium, cyclohexylmagnesium, phenylmagnesium, biphenylmagnesium, diphenylmethylmagnesium, triphenylmethylmagnesium fluorenylmagnesium, octylphenylmagnesium, allylmagnesium, or Grignard reagents in which the organic group contains a heteroatom as 2-pyridinylmagnesium bromide, 4-trifluoromethylphenylmagnesium bromide.

While in the present preparations there have regularly been used organomagnesium bromides, there are systems in which there may be successfully used in place of these bromides various organomagnesium chlorides.

A conventional Grignard reagent, RMgX, where X is bromine, may be used, or a compound $R_2Mg$, or a mixture of these two.

To carry out the process of this invention, an organomagnesium compound or a mixture of compounds is mixed with a limited amount of an acrylic ester at a temperature of about 3° to 40° C., preferably 10° to 30° C. While the mixture may be prepared and used shortly thereafter for some monomers, it has been found preferable to mix organomagnesium compound and ester and allow this mixture to stand for at least ten minutes up to several days under substantially anaerobic and anhydrous conditions. Preferred times of standing are two to twenty-four hours. In handling the organomagnesium compound, it is desirable, although not essential, to avoid the presence of water or moisture, alcohols, and other compounds having a reactive hydrogen by the Zerewitinoff test. Such compounds react with the organomagnesium compound to consume some of it.

It is not necessary to work in the complete absence of oxygen, for small amounts of oxygen actually may serve to activate the catalyst, particularly under the conditions of the process of this invention. It is, in general, desirable, however, to displace the bulk of the air in a reaction vessel with an inert gas, such as nitrogen or helium. If it is desired to activate with oxygen, controlled amounts of oxygen or air can then be added with certainty of duplication of results. There may thus be used up to about 0.04 mole of oxygen per liter of polymerizing solution, 0.01 to 0.02 mole appearing optimum, the amount of oxygen being proportioned to the amount of organomagnesium compound.

It is applicants hypothesis that in the mixture of organomagnesium compound and a limited amount of ester there is reaction with impurities or extraneous materials which are present in traces, as well as formation of ions by reaction of organomagnesium compound with ester. Impurities would act as terminators for the ion chains and after removal of impurities, it is theorized without limitation of the invention thereto that the ion chains of the desired type can become relatively long before their termination occurs. Furthermore, during the pre-reaction, it appears that any non-stereoregular chains may tend to terminate at an early stage, thus leaving more stereoregular chains to continue to propagate, thus improving stereoregularity. Time is needed to react impurities and any reactive extraneous materials which may be present in the reaction system and to permit termination of non-regular chains before the rest of the monomer is supplied. Then the initial ion chains which result from ester and organo-magnesium compound and which have stereoregular arrangement can continue to develop at the reduced temperatures.

The mixture of organomagnesium compound and monomer, with or without the presence of an inert organic solvent, is combined with the bulk of the monomer to be polymerized together with solvent and the resulting mixture is cooled and held between about 0° and —100° C. When acrylates are being polymerized, the preferred temperatures are between —30° and —80° C. With methacrylates, the temperatures are preferably between —10° and —80° C.

After polymer has been formed, it may be precipitated, if in solution, by mixing the solution with an organic liquid which is a poor solvent for the polymer. Where the polymer has precipitated from solution, or is precipitated by use of a poor solvent, the polymer can be filtered off, washed, and dried.

Further details of typical illustrative procedures are given in the examples which follow.

*Example 1*

Two hundred and sixty-two parts by volume of anhydrous toluene is placed in a reaction vessel equipped with a mechanical stirrer, thermometer, addition funnel, and inlet and outlet tubes for nitrogen gas. One neck of the vessel is covered with a rubber serum cap. Anhydrous, oxygen-free nitrogen is passed through the toluene for one hour to remove dissolved oxygen and to displace air from the apparatus. Nitrogen is passed through the system for the entire duration of the preparation. This same degassing procedure is followed for the charge to be added of isopropyl acrylate monomer, care being taken to prevent any monomer coming in contact with the toluene in advance. For the pre-reaction, 1.53 parts by volume of the isopropyl acrylate is added to the toluene followed by 3.66 parts by volume of 3.28 molar phenylmagnesium bromide solution in diethyl ether. This corresponds to a molar ratio of initiator/monomer of 1.0. The pre-reaction mixture is stirred at room temperature (about 30° C.) for 15 minutes. The system is then cooled to —70° C. and 36.9 parts by volume of degassed isopropyl acrylate is added to the reaction mixture over a period of 5 to 10 minutes. The mixture is stirred and polymerization is effected at —70° C. for 15 to 20 hours and then stopped by the addition of 2 parts by volume of methyl alcohol. There results a highly viscous solution of polymer, which may approach a gel. The polymer is precipitated by mixing the gel with petroleum ether (1 part by volume gel to 10 parts by volume precipitant). The polymer is dried in vacuo at 60° C. and then washed free of inorganic impurities by stirring for 3 hours in 300 parts by volume of a solution comprised of 1500 parts by volume of methanol, 1500 parts by volume of water, and 90 parts by volume of 36% hydrochloric acid. This is followed by stirring for 3 more hours in 300 parts by volume of a solution containing 1500 parts of methanol by volume and 1500 parts of water by volume. The polymer is then washed with deionized water and dried in vacuo at 60° C. There is obtained 28.1 parts of poly(isopropyl acrylate) having an $\overline{M}_v$ of 2,000,000 and a C-value of 1.58.

$\overline{M}_v$ is the viscosity average molecular weight, as defined, for example, in Flory's book, Principles of Polymer Chemistry, Cornell University Press, Ithaca, New York, 1953.

The C-value is a parameter which is used to compare the relative amounts of crystallinity. This value is derived from infrared spectra of specimens which are given a standard post-isolation treatment. It is calculated from changes in absorption bands (at 768 and 795 cm.$^{-1}$) in going from an amorphous polymer to its crystalline modification. Such modification here is developed by heating a thin film at a temperature of 130° C. for one hour, cooling to 80° C. over a 45-minute period, and then holding the sample at 80° C. for one hour. The spectra are subsequently obtained at room temperature. Amorphous modifications give C-values of about 0.3. This value increases with increasing crystallinity.

This polymer, then, is of relatively high molecular weight and is distinctly crystalline. It is completely lacking in the tackiness which seems inherent in amorphous poly(isopropyl acrylate) at room temperatures. It is not fully soluble in many common organic sovents but is completely soluble in such solvents as chloroform. A solution of this polymer may be applied to a layer of tacky acrylic polymer and serve to give a dry surface.

If this procedure is repeated except for the absence of pre-reaction, 26.7 parts of poly(isopropyl acrylate) having an $\overline{M}_v$ of 100,000 and a C-value of 1.32 is obtained.

(a) Essentially equivalent results are obtained if xylene at —40° C. is used instead of toluene; and, if helium is used instead of nitrogen, even better results are obtained. Essentially equivalent results are also obtained if polymerization is effected at other temperatures between —80° and —30° C.

(b) In a similar procedure, the ratio of initiator to monomer in the pre-reaction mixture is changed to 0.50. Fourteen and five-tenths parts of poly(isopropyl acrylate) having an $\overline{M}_v$ of 1,120,000 and a C-value of 1.83 is obtained.

(c) In another similar experiment, the ratio of initiator to monomer in the pre-reaction mixture is changed to 0.66. Twenty-three and five-tenths parts of poly(isopropyl acrylate) having an $\overline{M}_v$ of about 3,800,000 and a C-value of 1.80 is obtained.

(d) In still another similar preparation, the ratio of initiator to monomer in the pre-reaction is changed to 0.8 (3.84 parts by volume of isopropyl acrylate and 7.66 parts by volume of 3.13 M phenylmagnesium bromide etherate). After the system is cooled to —70° C., 15.4 parts by volume of isopropyl acrylate is added. After an 18-hour polymerization period, the polymer is washed and isolated in a single step using one part by volume of polymer gel and 10 parts by volume of a precipitant consisting of 1800 parts by volume of methanol, 320 parts by volume of water, and 70 parts by volume of 36% hydrochloric acid. The polymer is rinsed with deionized water and dried. Eleven and seven-tenths parts of poly(isopropyl acrylate) representing a 68.2% yield is obtained. The polymer $\overline{M}_v$ is 87,000 and the C-value is 0.96. This polymer is obtained in considerably higher yield and has higher molecular weight and higher C-value than would have been obtained if there had not been a pre-reaction.

*Example 2*

Two hundred and sixty-two parts by volume of anhydrous toluene is placed in a reaction vessel equipped with a mechanical stirrer, thermometer, addition funnel, and inlet and outlet tubes for nitrogen gas. One neck of the vessel is covered with a rubber serum cap. Anhydrous, oxygen-free nitrogen is passed through the toluene for one hour to remove dissolved oxygen and to displace air from the apparatus. This same degassing procedure is followed for the charge of isopropyl acrylate monomer to be used, care being taken to prevent any monomer coming in contact with the toluene at this stage. For the pre-reaction, 1.53 parts by volume of the treated isopropyl acrylate is added to the toluene followed by 3.8 parts by volume of 3.13 M phenylmagnesium bromide solution in diethyl ether. The system is then closed and 146.6 parts by volume of nitrogen is withdrawn. This is replaced by 146.6 parts by volume of oxygen injected into the liquid. The pre-reaction mixture is stirred for 10 minutes at room temperature and 10 minutes at +3° C. After this time, nitrogen is again bubbled through the system and the system cooled to —70° C. Then 36.9 parts by volume of isopropyl acrylate is added to the system over a 5- to 10-minute period. The polymerization system is kept with agitation at —70° C. for 15 to 18 hours and then polymerization is terminated by a single step isolation and washing procedure. This consists of precipitation of one part by volume of polymer gel in 10 parts by volume of a precipitant consisting of 1800 parts by volume of methanol, 320 parts by volume of water, and 70 parts by volume of 36% hydrochloric acid. The polymer is filtered off and rinsed with deionized water and dried. There is obtained 29.9 parts (87.2% yield) of poly(isopropyl acrylate) having an $\overline{M}_v$ of 2,400,000 and a C-value of 1.92. This polymer of high molecular weight is highly crystalline. It has the solubility properties described above.

*Example 3*

Two hundred and sixty-two parts by volume of anhydrous toluene is placed in a reaction vessel equipped as above. Anhydrous, oxygen-free nitrogen is passed through the toluene for one hour to remove dissolved oxygen and to displace air from the apparatus. This same degassing procedure is followed for the charge of isopropyl acrylate monomer, care being taken to prevent monomer coming in contact with the toluene. Nitrogen is passed through the reaction system for the entire duration of the preparation. For the pre-reaction, the system is cooled to 3° C.; and 1.53 parts by volume of isopropyl acrylate is added to the toluene followed by 3.8 parts by volume of 3.13 M phenylmagnesium bromide solution in diethyl ether. The pre-reaction is allowed to proceed for 3 hours at +3° C. with stirring. The system is then cooled to —70° C. and 36.9 parts by volume of isopropyl acrylate is added over a 5- to 10-minute period. The polymerization is effected with stirring at —70° C. for 15 to 18 hours. It is terminated by a single step isolation and washing procedure consisting of precipitation of one part by volume of polymer gel in 10 parts by volume of a precipitant consisting of 1800 parts by volume of methanol, 320 parts by volume of water, and 70 parts by volume of 36% hydrochloric acid. The polymer is filtered off and rinsed with deionized water and dried. There is obtained 30.4 parts (88.7% yield) of poly(isopropyl acrylate) having an $\overline{M}_v$ of about 9,700,000 and a C-value of 1.82. This polymer is unusually crystalline and of high molecular weight. It can be extruded with heat (180° C.) and pressure through an orifice to form a fiber with tensile strength of 11,000 p.s.i. The elongation is 35%. The polymer gives a clear film. It remains flexible and strong over a range from —20° C. to 140° C.

*Example 4*

(a) In a similar procedure, the pre-reaction is effected over a period of 18 hours. There is obtained 25.3 parts of poly(isopropyl acrylate) having an $\overline{M}_v$ of about 11,000,000 and a C-value of 2.05.

(b) In a similar procedure, 273 parts by volume of toluene is used with a total of 27.0 parts by volume of methyl acrylate monomer. For the 3-hour pre-reaction, 1.08 parts by volume of the methyl acrylate is used with 3.90 parts by volume of 3.07 M phenylmagnesium bromide in diethyl ether. There is obtained 5.16 parts of poly(methyl acrylate) having an $\overline{M}_v$ of 130,000. This is a higher molecular weight than is achieved without pre-reaction, which normally gives values of only 20,000 to 30,000.

(c) In a similar procedure, 266.4 parts of toluene is used with a total of 33.6 parts of allyl acrylate monomer. For the 3-hour pre-preaction, 1.34 parts of the allyl acrylate is used with 3.90 parts by volume of 3.07 M phenylmagnesium bromide solution in diethyl ether.

There is obtained 6.72 parts of poly(allyl acrylate) having an $\overline{M}_v$ of 120,000. This is a higher molecular weight than results from a process without pre-reaction.

(d) In a similar way, 244.5 parts of toluene is used with a total of 55.5 parts of 2-ethylhexyl acrylate monomer. For the 3-hour pre-reaction, 2.22 parts of the 2-ethylhexyl acrylate is used with 3.90 parts by volume of 3.07 M phenylmagnesium bromide solution in diethyl ether. There is obtained 44.0 parts of poly(2-ethylhexyl acrylate) having an $\overline{M}_v$ of 850,000. This is a higher molecular weight than is achieved without pre-reaction (230,000).

(e) In a similar way, 251.4 parts of toluene is used with a total of 48.6 parts of phenyl methacrylate monomer. For the 3-hour pre-reaction, 2.04 parts of the phenyl methacrylate is used with 3.90 parts by volume of 3.07 M phenylmagnesium bromide in diethyl ether. The polymerization temperature in this case is 0° C. There is obtained 35.3 parts of poly(phenyl methacrylate) having an $\overline{M}_v$ of 940,000. This is a higher molecular weight than would have been achieved without pre-reaction (100,000).

(f) In a similar way, 202.2 parts of toluene is used with a total of 97.8 parts of stearyl methacrylate monomer. For the 3-hour pre-reaction, 3.9 parts of the stearyl methacrylate is used with 3.90 parts by volume of 3.07 M phenylmagnesium bromide in diethyl ether. The polymerization temperature is 0° C. in this case. There is obtained 58.7 parts of poly(stearyl methacrylate) having an $\overline{M}_v$ of 410,000. This is a higher molecular weight than would have been achieved without pre-reaction.

(g) In a similar way, 247.2 parts of toluene is used with a total of 52.8 parts of benzyl methacrylate monomer. For the 3-hour pre-reaction, 2.1 parts of the benzyl methacrylate is used with 3.90 parts by volume of 3.07 M phenylmagnesium bromide in diethyl ether. The polymerization temperature in this case is 0° C. There is obtained 45.0 parts of poly(benzyl methacrylate) having an $\overline{M}_v$ of 600,000. This is a higher molecular weight than is obtained in the absence of pre-reaction.

*Example 5*

To a reaction flask equipped as described in Examples 1 and 2, there is charged 262 parts by volume of anhydrous toluene. Anhydrous, oxygen-free nitrogen is passed through the toluene for one hour to remove dissolved oxygen and to displace air from the apparatus. This same degassing procedure is followed for the charge of isopropyl acrylate monomer, care being taken not to allow any monomer to come in contact with the toluene in advance. For the pre-reaction, 1.53 parts by volume of the isopropyl acrylate is added to the toluene followed by 7.45 parts by volume of 1.61 M sec-butylmagnesium bromide in diethyl ether solution. The system is closed and 123.2 parts by volume of nitrogen is withdrawn. This is replaced by 123.2 parts by volume of oxygen injected into the liquid. The pre-reaction mixture is stirred for 10 minutes at room temperature and 10 minutes at +3° C. After this time, nitrogen is again bubbled through the system and the system cooled to −70° C. Then, 36.9 parts by volume of isopropyl acrylate is added to the system over a 5- to 10-minute period. The polymerization is effected with stirring at −70° C. for 15 to 18 hours and then terminated by the addition of 2 parts by volume of methyl alcohol. The polymer is then precipitated into petroleum ether (1 part by volume of polymer gel and 10 parts by volume precipitant). The polymer is dried and then washed free of inorganic impurities by stirring for 3 hours in 300 parts by volume of a solution comprised of 1500 parts by volume of methanol, 1500 parts by volume of water, and 90 parts by volume of 36% hydrochloric acid. This is followed by stirring for 3 more hours in 300 parts by volume of a solution prepared by mixing 1500 parts by volume of methanol and 1500 parts by volume of water. The polymer is then washed with deionized water and dried. There is obtained 16.9 parts of poly(isopropyl acrylate) having an $\overline{M}_v$ of 807,000 and a C-value of 1.69. Without the pre-reaction and under otherwise comparable conditions, polymers obtained have an $\overline{M}_v$ of 110,000 and a C-value of 1.34.

*Example 6*

To a reaction flask equipped as described in Examples 1 and 2, there is charged 262 parts by volume of anhydrous toluene. Anhydrous, oxygen-free nitrogen is passed through the toluene for one hour to remove dissolved oxygen and to displace air from the apparatus. Nitrogen is bubbled through the system for the entire duration of the experiment. This same degassing procedure is followed for the isopropyl acrylate monomer as in above examples. For the pre-reaction, 1.53 parts by volume of the isopropyl acrylate is added to the toluene followed by 2.96 parts by volume of 2.03 M diphenylmagnesium solution in diethyl ether. The pre-reaction mixture is stirred for about 15 minutes at room temperature. After this, the system is cooled to −70° C. and 36.9 parts by volume of the prepared isopropyl acrylate is added over a 5- to 10-minute period. The polymerization mixture is maintained at −70° C. for 15 to 18 hours. Polymerization is terminated by the addition of 2 parts by volume of methanol. The polymer is isolated and washed in the same manner as described in Example 5. There is obtained 27.1 parts of poly(isopropyl acrylate) having an $\overline{M}_v$ of 2,150,000 and a C-value of 0.53.

If the same procedure is followed without a pre-reaction, there is obtained 28.7 parts of poly(isopropyl acrylate) having an $\overline{M}_v$ of 33,100 and a C-value of 1.58. This degree of crystallinity is due to use of the particular initiator.

*Example 7*

To a reaction flask equipped as described in Examples 1 and 2, there is charged 262 parts by volume of anhydrous n-hexane. Anhydrous, oxygen-free nitrogen is passed through the n-hexane for one hour to remove dissolved oxygen and to displace air from the apparatus. Nitrogen is bubbled through the system for the entire duration of the experiment. This same degassing procedure is followed for the isopropyl acrylate monomer as before. For the pre-reaction, 1.53 parts by volume of the isopropyl acrylate is added to the n-hexane followed by 3.66 parts by volume of 3.28 M phenylmagnesium bromide solution in diethyl ether. The pre-reaction is stirred at room temperature for about an hour. The system is then cooled to −70° C. and 36.9 parts by volume of the isopropyl acrylate is added over a 5- to 10-minute period. The polymerizing mixture is kept at −70° C. for 15 to 18 hours and then polymerization is terminated by the addition of 2 parts by volume of methanol. The resulting polymer is filtered off and dried. The inorganic impurities are removed by the same washing procedure as described in Example 5. There is obtained 15.0 parts of poly(isopropyl acrylate) having an $\overline{M}_v$ of 300,000 and a C-value of 1.5. This is a higher molecular weight and C-value than would have been obtained in a similar polymerization without pre-reaction. Typical values would be 36,000 to 50,000 for molecular weight and 0.7 to 1.1 for C-values.

*Example 8*

To a reaction flask equipped as described in Example 2, there is charged 257 parts by volume of anhydrous toluene. Anhydrous oxygen-free nitrogen is passed through the toluene for one hour to remove the dissolved oxygen and displace air from the apparatus. This same degassing procedure is followed for the charge of sec-butyl acrylate monomer, care being taken to prevent monomer coming in contact with the toluene in advance. For the pre-reaction, 1.72 parts by volume of sec-butyl acrylate is added to the toluene followed by 3.83 parts by volume of 3.13 M phenylmagnesium bromide in diethyl ether. The system is closed and 123.2 parts by volume of nitrogen are withdrawn. An equal volume of oxygen is introduced into the mixture. The pre-reaction mixture is stirred for 10 minutes at room temperature and 10 minutes at +3° C. After this time, nitrogen is again bubbled through the system and the system cooled to −70° C. Then, 41.3 parts by volume of the sec-butyl acrylate is added over a 5- to 10-minute period. The polymerization is kept at −70° C. for 15 to 18 hours with stirring and then terminated by a single-step isolation and washing procedure as described in Example 3. There is obtained 27.0 parts of poly(sec-butyl acrylate) having an $\overline{M}_v$ of 358,000 and a C-value of 1.04. If a similar procedure is followed but without a pre-reaction, there is obtained 27.4 parts of poly(sec-butyl acrylate) having an $\overline{M}_v$ of 149,000 and a C-value of 0.82.

*Example 9*

In a similar procedure, 268 parts by volume of anhydrous toluene is used with a total of 32 parts by volume of methyl methacrylate monomer; 1.53 parts by volume of the methyl methacrylate is used in the pre-reaction along with 4.7 parts by volume of a 2.54 M phenylmagnesium bromide solution in diethyl ether. The polymerization temperature is 0° C. There is obtained 27.9 parts of poly(methyl methacrylate) having an $\overline{M}_v$ of 1,310,000.

If a similar procedure is followed, but without pre-reaction, there is obtained 25.2 parts of poly(methyl methacrylate) having an $\overline{M}_v$ of 740,000.

*Example 10*

To a reaction flask equipped as described in Examples 1 and 2, there is charged 255 parts by volume of anhydrous toluene. Anhydrous oxygen-free nitrogen is passed through the toluene for one hour to remove dissolved oxygen and to displace air from the apparatus. Nitrogen is bubbled through the system for the entire duration of the process. This same degassing procedure is followed for the charge of cyclohexyl acrylate monomer, care being taken to prevent premature contact of monomer and toluene. Nitrogen is passed through the reaction system during the rest of the procedure. For the pre-reaction, the toluene is cooled to +3° C. and 1.80 parts by volume of cyclohexyl acrylate is added to the toluene followed by 3.80 parts by volume of 3.13 M phenylmagnesium bromide in diethyl ether. The pre-reaction proceeds for three hours at +3° C. with stirring. The solution is then cooled to −70° C. and 43.2 parts by volume of the cyclohexyl acrylate is added over a 5- to 10-minute period. The polymerization is effected with stirring at −70° C. for 15 to 18 hours. It is terminated by a single step for isolation and washing as described in Example 3. There is obtained 39.1 parts of poly(cyclohexyl acrylate) having an $\overline{M}_v$ of 1,000,000. This polymer is so stereoregular that it becomes crystalline merely upon being annealed at 115° C. for 24 hours. Without pre-reaction, such annealing treatment does not develop crystallinity.

*Example 11*

(a) In a similar way, a total of 256.6 parts by volume of toluene is used with a total of 43.4 parts by volume of tert-butyl acrylate monomer. For the pre-reaction, 1.74 parts by volume of the tert-butyl acrylate is used with 3.80 parts by volume of 3.13 M phenylmagnesium bromide solution in diethyl ether. There is obtained 32 parts of poly(tert-butyl acrylate) having an $\overline{M}_v$ of 500,000. Again, this is a much greater value than can be obtained by the comparable procedure without pre-reaction. Furthermore, without pre-reaction, a yield of only 17 parts of polymer is obtained.

(b) In still another similar preparation, 235.7 parts by volume of anhydrous toluene is used with a total of 64.3 parts by volume of isobornyl acrylate monomer. For the pre-reaction, 2.57 parts by volume of the isobornyl acrylate monomer is used with 3.80 parts by volume of 3.13 M phenylmagnesium bromide solution in diethyl ether. There is obtained 55 parts of poly(isobornyl acrylate) having an $\overline{M}_v$ of 950,000. This polymer is characterized by marked stereoregularity, high melting point, and yet good solubility in many organic solvents.

(c) In yet another similar preparation, 254 parts by volume of toluene is used with a mixed monomer solution consisting of 42.8 parts by volume of cyclohexyl acrylate and 3.2 parts by volume of isobornyl acrylate. For the pre-reaction 1.84 parts by volume of the mixed monomer solution is used with 3.8 parts by volume of 3.13 M phenylmagnesium bromide solution in diethyl ether. There is obtained 41.6 parts of a copolymer of cyclohexyl acrylate and isobornyl acrylate having an $\overline{M}_v$ of 742,300.

Without pre-reaction, the copolymer similarly obtained has a molecular weight of only 200,000 and cannot be crystallized by annealing.

*Example 12*

To a reaction flask equipped as described in Example 2, there is charged 290 parts by volume of anhydrous toluene. Anhydrous, oxygen-free nitrogen is passed through the toluene for 15 minutes to remove dissolved oxygen and to displace air from the apparatus. This same degassing procedure is used for the monomer mixture consisting of 41.2 parts by volume of isopropyl acrylate and 2.14 parts by volume of isobornyl acrylate, care being taken to avoid premature mixing of monomer with the toluene. Nitrogen is passed through the system for the duration of the experiment. For the pre-reaction, 1.53 parts by volume of the monomer mixture is added to the toluene followed by 4.7 parts by volume of 2.54 M phenylmagnesium bromide in diethyl ether. The pre-reaction is stirred at room temperature for 10 minutes. The system is cooled to −70° C. and 41.8 parts by volume of the monomer mixture is added to the toluene over a 5- to 10-minute period. The polymerization mixture is held at −70° C. for 15 to 18 hours. After this time, polymerization is terminated by the addition of 2 parts by volume of methanol. The copolymer is then isolated and washed in the same manner as described in Example 5. There is obtained 26.3 parts of a copolymer of isopropyl acrylate and isobornyl acrylate having an $\overline{M}_v$ of 1,700,000. This copolymer has a C-value of 0.96, whereas a copolymer similarly formed but without pre-reaction has a C-value of 0.57 and an $\overline{M}_v$ of 210,000.

*Example 13*

In the same way, there is polymerized a mixture of 121.7 parts of isopropyl acrylate and 8.1 parts of 2-ethylhexyl acrylate. There is obtained a copolymer of these two esters having an $\overline{M}_v$ of 1,020,000 and a C-value of 1.04. Without pre-reaction, values of 280,000 and 0.7 are obtained.

The process of this invention provides a way to control the size and type of polymer which is obtained and do so with fair reproducibility. It now becomes possible to obtain polymers with a narrower range of molecular weights than has heretofore been practical with organomagnesium catalysts. It also becomes possible to prepare polymers of relatively high molecular weight, when so desired, with an organomagnesium compound as catalyst. When toughness, flexibility, and strength are important, these properties may then be improved. For those esters which yield stereoregular polymers, the method of this invention also provides a way of increasing the stereoregularity and crystallinity when this is advantageous. Then, there can be obtained non-tacky polymers which are non-blocking and which have improved print-resistance. In the range of molecular weights below about 1,000,000, polymers are suitable for molding, although polymers with molecular weights above a half million would not be thus useful in the case of conventional polymers. These and polymers of even higher molecular weight are useful for coatings and films.

In those cases where the polymer is characterized by definite stereoregularity, the full benefits of stereoregularity may be achieved through crystallizing treatments such as annealing, mechanical working such as stretching, and treatment with a thermodynamically poor solvent, such as 4-heptanone.

This application is a continuation-in-part of our application Serial No. 849,762, filed October 30, 1959, now abandoned.

We claim:

1. A process for polymerizing at least one ester of an acid from the class consisting of acrylic acid and methacrylic acid, which esters are free of groups having hydrogen reacting in the Zerewitinoff test, which comprises mixing between about 3° and 40° C. said ester and about 0.3 to about 1.5 moles of an organomagnesium compound per mole of said ester, the organomagnesium compound being of the formula R—Mg—Y wherein R is a member of the class consisting of alkyl, cycloalkyl, aralkyl, aryl, alkenyl, aralkenyl, and alkynyl groups and Y represents a member of the class consisting of bromine and said R group, whereby a catalyst solution is formed, mixing said catalyst solution and a said ester in a ratio giving about 0.01 to about 0.2 mole of organomagnesium compound per mole of ester, cooling the resulting mixture, and maintaining it at a polymerizing temperature between 0° and —100° C. until polymer is formed.

2. A process according to claim 1 in which an organic solvent which is inert in the Zerewitinoff test is present under the polymerizing conditions.

3. A process for polymerizing at least one ester of acrylic acid which has an alcohol residue free of groups reacting in the Zerewitinoff test which comprises mixing between about 3° C. and 40° C. a said acrylic ester and about 0.5 to about 1.0 mole of an organomagnesium compound per mole of said ester, the organomagnesium compound being of the formula R—Mg—Y wherein R is a member of the class consisting of alkyl, cycloalkyl, aralkyl, aryl, alkenyl, and alkynyl groups and Y represents a member of the class consisting of bromine and said R group, whereby a catalyst solution is formed, mixing said catalyst and a said ester in a ratio giving about 0.04 to about 0.15 mole of organomagnesium compound per mole of ester in the mixture, cooling the resulting mixture, maintaining it at a polymerizing temperature between —30° to —80° C., whereby polymer is formed, and separating said polymer.

4. A process according to claim 3 in which said acrylic ester is isopropyl acrylate.

5. A process according to claim 3 in which said acrylic ester is sec-butyl acrylate.

6. A process according to claim 3 in which said acrylic ester is allyl acrylate.

7. A process for polymerizing at least one ester of methacrylic acid which has an alcohol residue free of groups reacting in the Zerewitinoff test which comprises mixing between about 10° and 30° C. a said methacrylic ester and about 0.5 to about 1.0 mole of an organomagnesium compound per mole of the ester, the organomagnesium compound being of the formula R—Mg—Y wherein R is a member of the class consisting of alkyl, cycloalkyl, aralkyl, aryl, alkenyl, and alkynyl groups and Y represents a member of the class consisting of bromine and said R group, whereby a catalyst solution is formed, mixing said catalyst solution and a said ester in a ratio giving about 0.04 to about 0.15 mole of organomagnesium compound per mole of ester in the mixture, cooling the resulting mixture, maintaining it between —10° and —80° C., whereby polymer is formed, and separating said polymer.

8. A process according to claim 7 in which said methacrylic ester is methyl methacrylate.

9. A process according to claim 7 in which said methacrylic ester is phenyl methacrylate.

10. A process for polymerizing at least one ester of an acid from the class consisting of acrylic acid and methacrylic acid, which ester is free of groups having hydrogen reacting with the Zerewitinoff test, which comprises mixing between about 3° C. and 40° C. said ester and about 0.3 to about 1.5 moles of an organomagnesium compound per mole of said ester, allowing the resulting mixture to stand under substantially anhydrous and anaerobic conditions for a period between about 10 minutes and 24 hours to form a catalyst solution, mixing an inert solvent, said catalyst solution, and a said ester in an amount to bring the ratio of organomagnesium to total ester into the range of about 0.01 to about 0.2 mole of said compound per mole of ester, and cooling and maintaining resulting mixture at a polymerizing temperature between 0° and —100° C. until polymer is formed, the organomagnesium compound being of the formula R—Mg—Y wherein R is a member of the class consisting of alkyl, cycloalkyl, aralkyl, aryl, alkenyl, aralkenyl, and alkynyl groups, and Y represents a member of the class consisting of bromine and said R group.

11. A process according to claim 10 in which polymerization is effected in a solution containing 0.1 to 3 moles of ester per liter of solution.

References Cited by the Examiner

UNITED STATES PATENTS

| 2,936,302 | 5/1960 | Jones et al. | 252—431 |
| 3,100,761 | 8/1963 | Fellmann et al. | 260—89.5 |
| 3,103,503 | 9/1963 | Fox et al. | 260—89.5 |

OTHER REFERENCES

Landler: Rec. Trav. Chem. Pays-bas, vol. 68, pages 992–998 (1949).

JOSEPH L. SCHOFER, *Primary Examiner.*

D. E. CZAJA, *Examiner.*